United States Patent [19]
Klötzner et al.
[11] 4,199,812
[45] Apr. 22, 1980

[54] APPARATUS FOR DETERMINING THE DURATION OF FUEL INJECTION CONTROL PULSES

[75] Inventors: Winfried Klötzner, Schwieberdingen; Rolf Däumer, Merklingen; Martin Zechnall, Schwieberdingen; Uwe Kiencke, Möglingen; Ulrich Flaig, Markgröningen, all of Fed. Rep. of Germany

[73] Assignee: Robert Bosch GmbH, Stuttgart, Fed. Rep. of Germany

[21] Appl. No.: 920,578

[22] Filed: Jun. 29, 1978

Related U.S. Application Data

[63] Continuation of Ser. No. 742,711, Nov. 17, 1976, abandoned.

[30] Foreign Application Priority Data

Nov. 18, 1975 [DE] Fed. Rep. of Germany ....... 2551639

[51] Int. Cl.[2] ......................... F02D 5/00; G06F 15/50
[52] U.S. Cl. ............................... 364/431; 123/32 EC; 123/32 EE; 364/117
[58] Field of Search ....................... 364/424, 431, 442; 123/32 EA, 32 EB, 32 EE, 32 ED, 32 EC

[56] References Cited

U.S. PATENT DOCUMENTS

| | | | |
|---|---|---|---|
| 3,898,962 | 8/1975 | Honig et al. | 123/32 EB |
| 3,964,443 | 6/1976 | Hartford | 123/32 EA |
| 3,986,006 | 10/1976 | Kawai et al. | 123/32 EA |
| 3,991,727 | 11/1976 | Kawai et al. | 123/32 EA |
| 4,107,921 | 8/1978 | Iizuka | 123/32 EE |
| 4,116,169 | 9/1978 | Krupp et al. | 123/32 EB |

FOREIGN PATENT DOCUMENTS

| | | | |
|---|---|---|---|
| 2600673 | 1/1976 | Fed. Rep. of Germany | 123/32 EE |
| 2604446 | 8/1976 | Fed. Rep. of Germany | 123/32 ED |

*Primary Examiner*—Felix D. Gruber
*Attorney, Agent, or Firm*—Edwin E. Greigg

[57] ABSTRACT

A fuel injection system receives valve control pulses, the length of which determines the fuel quantity delivered to the engine. A first counter receives a pulse train whose frequency depends on the air flow rate and this pulse train is admitted for a period defined by the engine speed. The content of the counter is then counted out at a frequency which is synthesized from operational parameters of the engine, including, in particular, the temperature. For this purpose, there is generated a temperature-dependent frequency which is fed to a multiplier circuit which combines this frequency with data derived from a memory to generate an output signal which is further processed to provide the fuel injection pulses for the engine.

13 Claims, 4 Drawing Figures

APPARATUS FOR DETERMINING THE DURATION OF FUEL INJECTION CONTROL PULSES

This is a continuation, of application Ser. No. 742,711, filed Nov. 17, 1976 and now abandoned.

BACKGROUND OF THE INVENTION

The invention relates to a system for determining the duration of injection-control commands to be applied to fuel injection valves associated with an internal combustion engine, the duration of the fuel injection depending, among other factors, on the rpm, the airflow rate in the suction tube and the temperature of the internal combustion engine. The airflow rate is monitored by an airflow meter generating a proportional output voltage, while a temperature sensor close to the engine monitors engine temperature, and a tachometer monitors engine rpm. Furthermore, a computer circuit utilizes the rpm, temperature and airflow rate data and calculates from such data the duration (ti) of the injection pulses.

In a known fuel injection system for controlling at least one injection valve of an internal combustion engine as a function of the airflow rate, DC signals are formed in a computer circuit which are proportional to the airflow rate and to crankshaft rpm. These signals are further processed as analog signals in DC amplifier stages. In such analog computers the latter must be balanced very precisely, because difficulties can arise with respect to long-term drift. Also, such analog computers are sensitive to interference pulses. Difficulties do arise on that account especially when these types of devices are used with motor vehicles. For example, the ignition system or the system producing the directional signals in the motor vehicle can give rise to such interfering pulses, which are beyond control.

OBJECT AND SUMMARY OF THE INVENTION

It is, therefore, a principal object of the present invention to so improve such fuel injection systems so that the sensitivity to interfering pulses is significantly reduced, and so that the labor of balancing no longer is required.

This object is achieved by the present invention by providing a first counter fed during a predetermined crankshaft angle, by an input frequency proportional to the quantity of air taken in by the internal combustion engine and with a feedback-controlled analog-digital converter processing the output voltage of the airflow meter for the purpose of generating the air-quantity frequency. The temperature of the internal combustion engine is converted into a proportional frequency and is fed to a digital multiplier circuit for common processing with further operational parameters of the engine so as to generate an output frequency, the multiplier circuit being associated with a read-only storage which releases its stored data sequentially as a function of the further operational parameters, the data being multiplicable by the frequency of the temperature. The output frequency of the multiplier circuit may be applied together with at least one further frequency derived from at least one further operational parameter to at least one summation point in order to form an overall correction-frequency. A further counter is provided which takes over the contents of the first counter and the output of which is the overall correction frequency, the duration from the time of assumption of the contents until a predetermined count is reached in the further counter being a measure of the duration of injection per stroke.

Hence, the invention is in the nature of a digital computer circuit determining the injection time of at least one injection valve in the presence of injection-control commands in an internal combustion engine to which are applied initially essentially analog signals derived from the particular operational behavior of the engine.

Because such digital computer circuits may be driven, if necessary, at extremely high frequencies in very rapid cyclical sequences, the maximum possible error in the presence of even very frequent interference signals will be negligibly small. A special advantage furthermore is achieved in that integrated circuits or mostly integrated circuits may be used in the design of a digital computer determining the duration of injection in the fuel injection system. Furthermore, the possibility of providing differing modes for each vehicle, for instance for warm engine conditions, in the form of read-only memories to the particular fuel injections, which latter depending on need will call the required data upon need by addressing the memory. When passing from one motor vehicle to another, solely the read-only memory need be exchanged and be programmed correspondingly.

DESCRIPTION OF THE PREFERRED EMBODIMENTS

Figure 1:
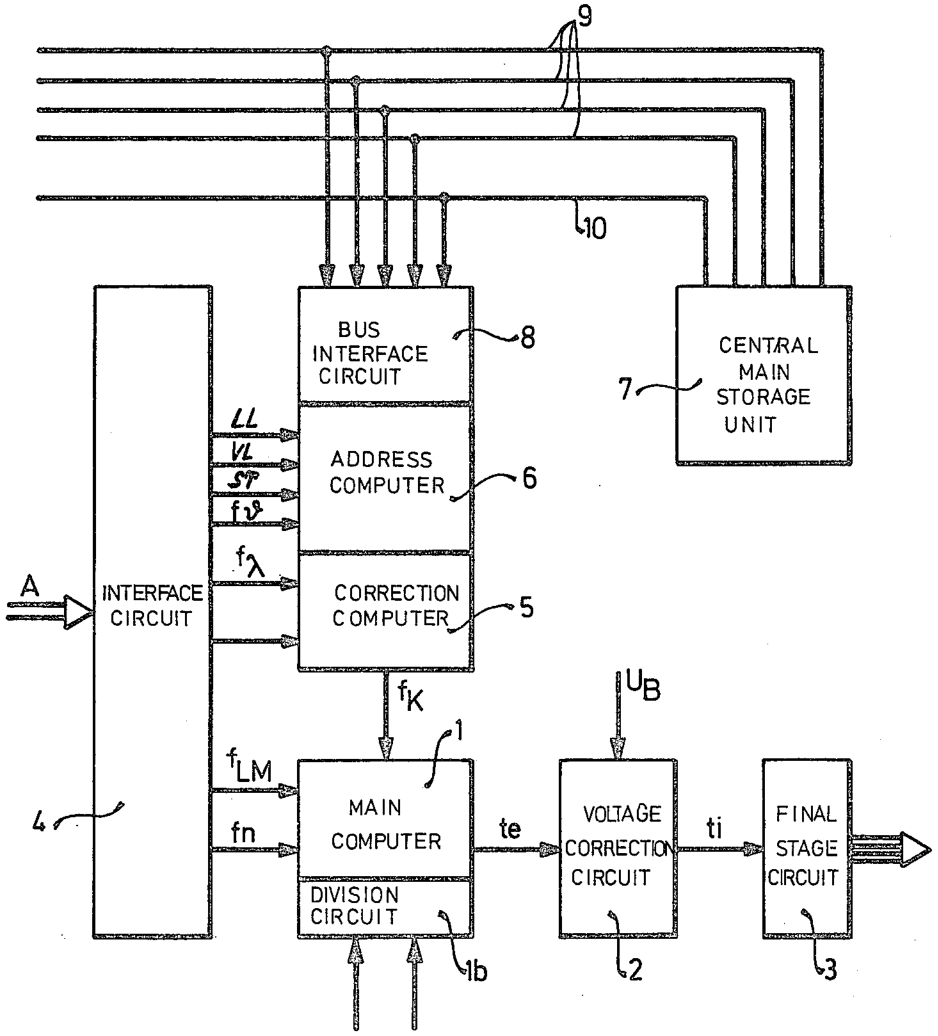
FIG. 1 is a block diagram of a first embodiment of a digital fuel injection system, where the central storage or memory required also stores data for individual computers used in a motor vehicle, and where individual computer access takes place over information lines common to all computers.

The fuel injection system shown in FIG. 1 includes a main computer 1 with an associated control part 1*b* which may be a division circuit. The control part 1*b* serves to adapt the overall system to the particular number of cylinders of the given internal combustion engine. The main computer 1 is followed by a voltage correction circuit 2 to which is applied the output pulse train of the main computer. The output pulse train from the main computer 1 already essentially determines the injection time per stroke by the lengths ($t_e$) of its individual pulses. The voltage correction circuit 2 is fed by the vehicle fluctuating power supply, $U_B$ and processes the pulse train applied to it by the main computer 1 in such a manner that the effect of any fluctuations in the power supply, beyond those produced by the rise and decay times of the injection valves, is eliminated. The pulse train so corrected is put out as a pulse train of pulse lengths (ti) at the output of the voltage correction circuit 2, and passes through a final stage circuit 3 to the fuel injection valves (not shown). The preferred design of the fuel injection valves is such that they will open electromagnetically for a time corresponding to the width of the pulses put out by the circuit 3, and will feed an amount of fuel corresponding to their opening times to the particular cylinders or to the suction tube of the engine. The opening times of the injection valves correspond to the duration of the injection control commands that are present.

The design of the main computer 1 is such as to comprise a counter or register counting an applied air-quantity frequence ($f_{LM}$) which is inversely proportional to the rpm (n) of the internal combustion engine, or recording it in such a manner that after expiration of the gating time, each frequency applied to it will correspond to a definite counter figure. In other words, the counter may also be of the stochastic kind, as will be discussed further hereinafter. The counter or register counts the expiration of the gating time by means of a correction frequency ($f_K$) applied to the main computer 1. This gating time will be counted downward until the initial count at the onset of the gating interval is reached. The time from initiation of the downward counting with the correction frequency reaching a predetermined count or the null value in the counter which may be a register is a measure of the effective duration of injection (te).

FIG. 1 indicates that three different input values must be applied to the main computer 1, namely, the already mentioned air-quantity frequency ($f_{LM}$), a correction frequency ($f_K$) and rpm information in the form of an rpm frequency (fn). The air-quantity frequency ($f_{LM}$) is preferably generated, according to control circuitry principles, from the analog signal in an upstream signal generating or interface circuit 4. The analog signal for the air-quantity frequency ($f_{LM}$) may be the output signal from a potentiometer changing in accordance with the position of an air flap in the suction tube of the internal combustion engine and preferably proportionally to the air-quantity through the suction tube. If proportionality should be impossible to obtain in this manner, appropriate correction circuits, known per se, may be used. This means that analog input signals are applied to input A of the junction or interface circuit 4 which is of such design that it will either generate synchronized output signals from these analog input signals that indicate the instantaneous operational conditions of the internal combustion engine, or that it will permit preferably direct processing by the digital computer circuit of the engine in the presence of frequencies due to continuously changing operational conditions, which always occur.

Idle or full-load signals derived, for example, from the position of the accelerator pedal, can also serve as input signals for the junction or interface circuit 4. Signals proportional to the temperature of the engine, for instance analog output potentials obtained by means of temperature-dependent elements, preferably (NTC) (negative temperature coefficient) resistors in the vicinity of the engine can also serve as suitable input signals. Furthermore those signals associated with engine starting, and finally those signals which derive from the composition of the exhaust gases can also serve as input signals. Changes in the composition of the exhaust gas result in an electrical, changing switching state which is a measure of the stoichiometric composition of the fuel-air mixture fed to the engine. Preferably a so called "oxygen probe" or λ probe will be used, which changes its output potential in an impulse like manner in the vicinity of the air coefficient or air number, $\lambda=1.0$. The air coefficient or air number is defined as the ratio of air mass to fuel mass in the mixture being supplied to the engine. The value $\lambda=1$ is obtained when there is a stoichiometric mixture of fuel and air. From all of these, and where appropriate from further input signals denoting the operational state of the internal combustion engine, output signals are generated by the interface circuit 4. Part of the output signals may occur simultaneously, as is the case, for instance, when starting from idle taking into account the temperature of the engine. But part of the output signals also will result only when the engine is operated continuously. As a rule however, all of the input signals denoting the operational state of the engine must be processed further, also taking into account the engine temperature. There will be further discussion below of several of the signals on the output side of the interface 4 in conjunction with the discussion of FIG. 2.

The correction frequency ($f_K$) required to count down the register content of the main computer 1 is applied to the computer 1 via a correction computer 5 which may be of various designs. In the simplest case, the correction frequency may be a constant one; but ordinarily it will be dependent on the various operational parameters of the engine, in particular on its temperature. When computing the correction frequency, the correction computer 5, for instance takes into account a number of particular instantaneous factors and parameters of the engine, for instance idle (LL), full load (VL), starting (ST), engine temperature, run-up boost after idle, temperature-dependent starting boost, temperature-and time-dependent post-starting mode, state of partial load, correction factor for λ regulation (various correction factors being feasible), and further possibly other operational states may be taken into account which will not be discussed in the consideration as a whole of the system for reasons of clarity.

It is obvious, however, that the operational parameters are different for practically every kind of internal combustion engine because such are of different characteristics as regards those factors, as those factors relate to one another and to engine temperature. Various input signals relating to any particular operational state of the engine are relatively easily accessible. It is then necessary to derive from these input signals, special data which apply to the particular model of the engine and which are then fed to the computer circuit to allow the computation of the correction frequency.

On that account, the present fuel injection system is provided with a basic read-only memory receiving a number of data to be polled and related to every operational state of the engine to be provided with fuel-injection pulses, special consideration also being given to temperature dependence.

As regards the embodiment shown in FIG. 1, an address computer 6 is provided in addition to the correction computer 5 in order to compute an address from the preferredly synchronized switching and state signals (which may be defined as status symbols) applied to it and complementarily from the engine temperature, and in order to interrogate by means of this address the memory for the specific data value to be considered when computing the correction frequency. If, as is possible with the preferred embodiment of FIG. 1, provision is made for still further individual computers for the operation of the internal combustion engine, for instance for computing the ignition timing, gear shift commands, and the like, then the memory may be designed to be a central main storage unit 7 which in such a case will be used only once but nevertheless must provide sufficient capacity to feed all individual computers connected to it. Addressing the central main storage unit 7 with the addresses from the address storage 6 derived from the status signals takes place through a matching or intermediate circuit 8 which always provides the connection between the associated single purpose computer and the central main storage unit 7. Intermediate circuit 8, which may also be termed "Bus interface circuit", provided that the information and enabling lines 9 and line 10 are designated as bus lines, receives the address for access to the central main storage unit 7 in the form, for example, of an 8-bit parallel word from address computer 6, then converts this address into binary sub-word groups depending on the number of bus lines present, for instance in two 4-bit words each. The bus interface circuit 8 then checks the occupancy of the bus lines on a separate occupancy line 10, occupies the bus lines when free and transmits the address in groups of binary words serially to the central main storage unit 7. Thereupon the bus interface circuit 8 waits for the transmission of the addressed information from the main storage unit, and receives it (comprising four bus lines in the illustrated embodiment) in 4-bit words twice and withdraws the enablement of the enabling line. The information received may then be passed on serially as an 8-bit word to correction computer 5. The sequential control of this process appropriately takes place by means of counters in individual synchronized steps.

The entire operational sequence of this computer circuit takes place synchronously, and an oscillator and frequency divider circuit discussed hereinafter is provided for that end. The oscillator and frequency divider circuit generates all the control pulses required in the circuit of FIG. 1 by dividing a fundamental frequency of synchronization, for instance 600 kHz. The oscillator and frequency divider circuit correspondingly generates multiplexing pulses for the main computer, and access pulses for the operational control in the address computer, control frequencies for the operational states of post-starting, of run-up boost, λ control and the like. Synchronizing control frequencies furthermore are needed to force the analog input circuit signals applied to the interface circuit 4 into a force-synchronized time-raster.

Figure 2:
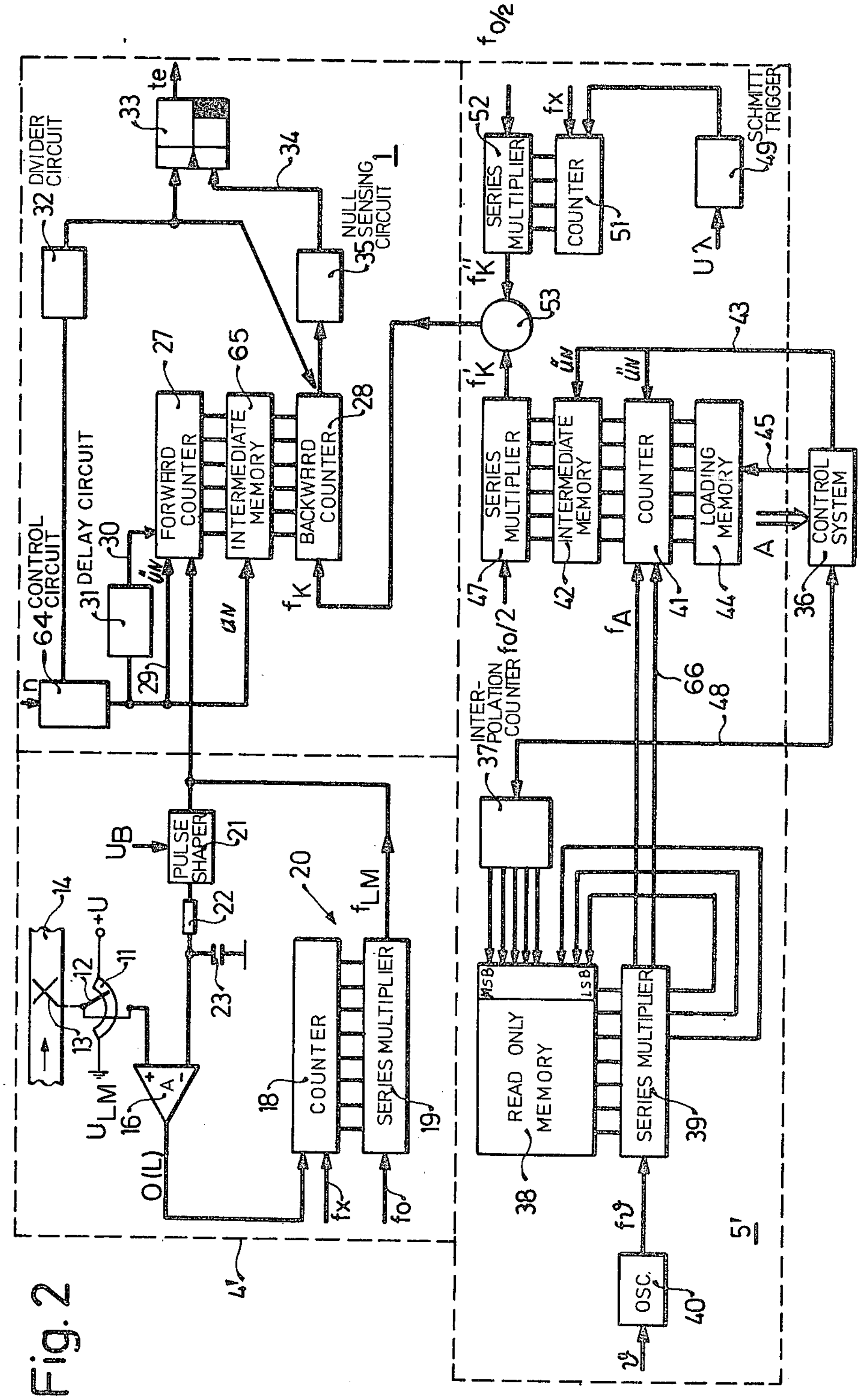
FIG. 2 represents a second embodiment of a digital fuel injection system according to FIG. 1, which is modified in that the memory is provided to the exclusion of the fuel injection system.

A further embodiment of a fuel-injection system's digital computer circuit is shown in FIG. 2 in more detail. In FIG. 2 the memory for the correction computer is associated directly and uniquely with same, so that the address computer and the bus-interface of FIG. 1 may be eliminated. The digital fuel-injection system of FIG. 2 is particularly notable by a marked economy in circuitry, mainly on account of using a new interpolation process when determining the storage values in correction computer 5' and when using stochastic counters in the main computer 1.

A consideration of the circuit diagram of FIG. 2 begins with a consideration of the partial circuit section 4'. The partial circuit section 4' generates an air-quantity frequency ($f_{LM}$) from the analog input potential proportional to the air-quantity taken in by the internal combustion engine.

An analog voltage signal $U_{LM}$ is applied to the circuit generating the airflow frequency ($f_{LM}$). This potential $U_{LM}$ is obtained for instance by means of a potentiometer 11 of which tap 12 is displaced by a pressure flap valve 13 located in the suction tube 14 of the engine and subjected to displacement depending on the amount of air taken in. There is no need to discuss more fully the analog airflow potential $U_{LM}$ proportional to the airflow taken in; this potential arrives in the form of an analog voltage to the non-inverted input, that is the (+) input of a comparator 16 which might be a difference amplifier. Another analog voltage is applied to the inverted input of comparator 16. This latter voltage will be discussed further below, but it is seen that its level determines the sign or the kind of the output signal from the comparator 16. The output signal from the comparator 16 is so designed that, if for instance, airflow potential $U_{LM}$ is larger than that applied to the other input, its output signal will be a first logic state, for instance a logical "0" whereas if the airflow potential $U_{LM}$ is less than the other, the comparator output for instance may be the logical state "1". The output of comparator 16 is connected to the sign input of a dual forward-backward or UP/DOWN counter 18, and therefore the sign of the output at comparator 16 determines the direction in which the forward-backward counter 18 counts a counting frequency (fx) fed to a second input.

Together with an associated series multipler 19, the dual forward-backward counter 18 forms a digit-frequency converter or a so-called DDA multiplier circuit 20, denoted as a digital-differential analyzer.

In order to better express the operation of the DDA multiplier 20, it first will be explained in the embodiment shown in FIG. 3. Basically a DDA may be designed as a series or as a parallel multiplier, a binary word being multiplied by a fundamental frequency. The parallel multiplier being more expensive, a series one is displayed in the present embodiment, with the individual sites of the binary word applied to it being valued in terms of the fundamental frequency. There results an output frequency which may be quite uneven in the form of the DDA frequency, but which has the advantage that it lends itself to be reconverted into an analog potential by relatively simple means, for instance by integration with an RC circuit.

Figures 3, 3A:
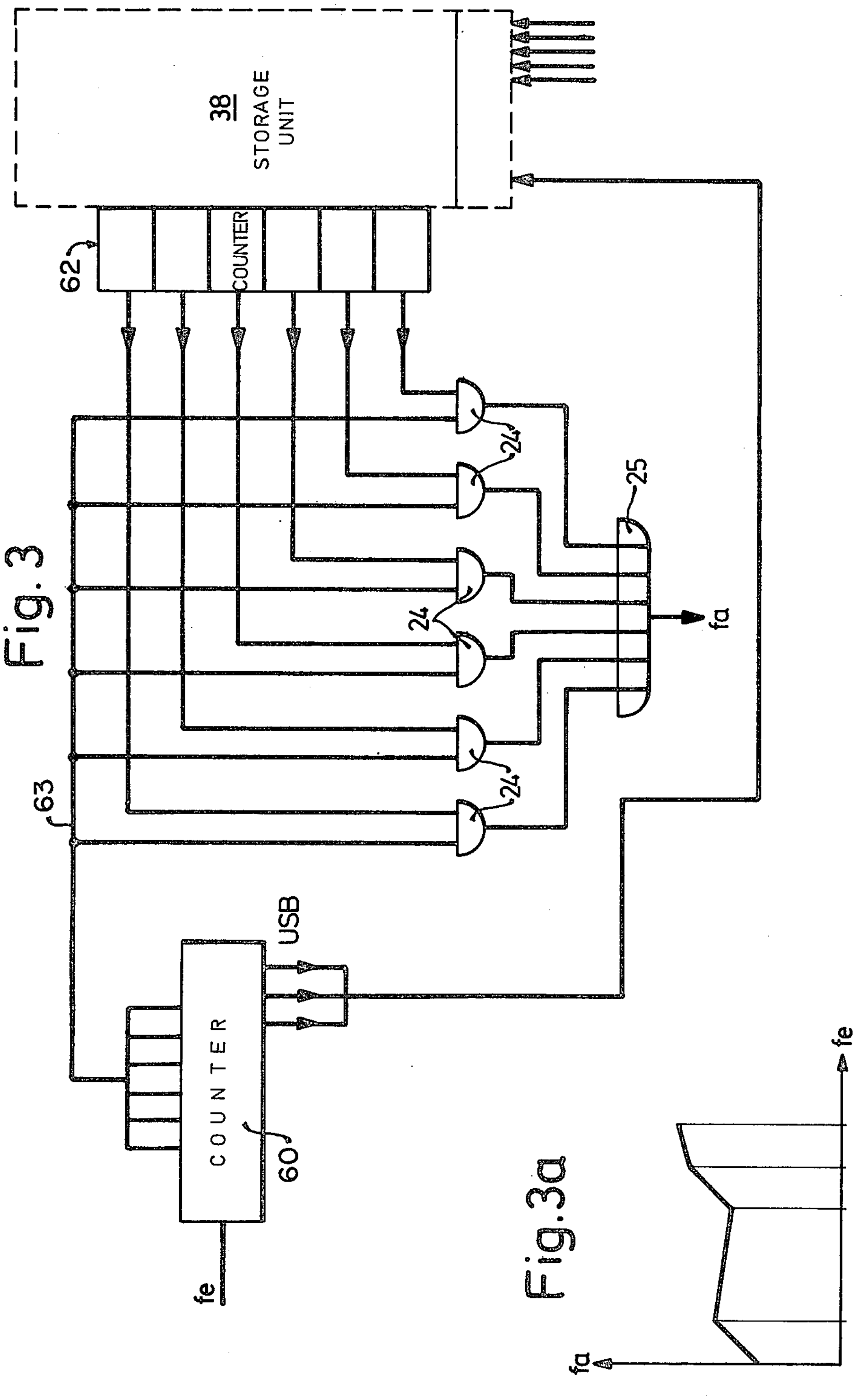
FIG. 3 illustrates a detailed design of a multiplication circuit frequently used in the circuits of FIGS. 1 and 2.
FIG. 3*a* shows the dependency of the output frequency (fa) on an input frequency (fe) for a so-called DDA multiplier used with the division circuit.

Frequency (fe) is shown as an input frequency in FIG. 3 for the series multiplier and is fed to a counter 21'. The counter 60 generates from the frequency (fe) a number of subharmonics of which the pulses are so shifted with respect to one another that these subharmonics may be added to form an overall frequency. In the simplest case, these subharmonics may be generated by a cascade of bistable multivibrators or flip-flops which each reduce the input frequency to one-half. The binary word used by the DDA multiplier of FIG. 3 to assign values to the subharmonics it has generated is located at the output of the register 60; such might for instance be the parallel outputs of the forward-backward counter 18 of FIG. 2, but—as further explained below—such might also be the parallel outputs of an intermediate storage, of a read-only memory or similar device. The subharmonics pass from the counter 60 via a junction line 63 to the particular inputs of AND gates 24, of which the other set of inputs are being loaded with the particular bit of the binary word from the counter or memory 60 denoting the particular frequency. The frequencies so formed at the outputs of the AND gates 24 are summed into an overall frequency (fa) by a subsequent OR gate 25. The individual frequencies are so connected to the sites of the binary word controlling the AND gate 24 that the highest frequency is connected to the MSB (most significant bit), that is to the higher-valued bit of the binary word. In this manner one obtains a mixture of the most varied frequencies depending on that assigned value which provides the binary word at the series multiplier. One thus obtains a functional dependence for the output frequency (fa) via the input frequency (fe) (see FIG. 3*a*), the slope of which is determined by the binary word that is at the series multiplier. The general formula for such a DDA multiplier therefore is:

$$fa = Zi \cdot fe,$$

where (Zi) is the binary word at the parallel output of the forward-backward counter, which varies depending on the sign applied to the dual forward-backward counter 18 of FIG. 2.

A fundamental synchronizing frequency (fo) is used as the input frequency to the series multiplier 19 of FIG. 2; it may be 600 kHz for instance. The output frequency $f_{LM}$ of series multiplier 19 then is proportional to the air-quantity taken in by the internal combustion engine, and is thereupon fed back to the input of that part of the circuit 4' acting so far as an analog-frequency converter through an intermediate circuit 21 for the purpose of pulse-shaping. The shaping circuit 21 at the same time is used to compensate the effect of any fluctuations of vehicle power, that is, it is so designed that the pulse amplitude of the $f_{LM}$ frequency applied to its input will so vary with the vehicle power $U_B$ also applied to it, that a compensation in this potential will be achieved at the same time. The output of shaping circuit 21 is connected through a resistance 22 and a grounded capacitor 23, acting as a simple integrating circuit, to the inverted input of comparator 16, whereby one obtains feedback and control of overall circuit operation, the output frequency $f_{LM}$ being continuously compared to the analog air-quantity input potential $U_{LM}$.

The air-quantity frequency $f_{LM}$ so obtained, and already previously mentioned, arrives at the main computer 1 at the input of a forward counter 27. The counter 27 counts the pulses of air-quantity frequency $f_{LM}$ during an angular section of the crankshaft rotation, and to that end, provision is made for a control circuit 64 fed by the rpm of the internal combustion engine, so that for instance the circuit causes the counting of the pulses of air-quantity frequency ($f_{LM}$), when an rpm pulse arrives via line 29, in forward counter 27, and stops the forward counting process of the counter if for instance there has been a rotation of 60° of the crankshaft. Thereupon the counter is reset via a line 30 and a delay network 31. The forward counter 27 displays a count corresponding to the air-quantity divided by the rpm. The binary number formed in counter 27 is fed in parallel to a further counter 28, provision being made, if desirable, for an intermediate memory 65 which takes over the count in counter 27 from control circuit 64 at the time of the pulse transfer, whereby counter 27 again is ready for the next counting process. A divider circuit 32 may be associated with control circuit 64 so as to reduce the rpm pulses fed to it by the control circuit 64, depending on the number of cylinders in the internal combustion engine, and so as to generate the enabling pulses for the contents of the intermediate memory to 65 the subsequent counter 28, designed as a backward counter. In simultaneity with the enabling pulse, a bistable circuit element, for instance a flip-flop 33, is flipped into one of its states; backward counter 28 then counts downward by means of the application of a correction frequency ($f_K$), which will be further discussed below, and upon reaching a predetermined count, for instance null, generates an output pulse which is fed through line 34 also to flip-flop 33, the flip-flop 33 thereby being flipped back into its initial state. The duration of the stable-time so obtained in flip-flop 33 is a measure of the duration of injection and corresponds to the pre-pulse time (te) already mentioned above. Backward counter 28 is provided to recognize null in null-sensing circuit 35. Forward counter 27 and backward counter 28 furthermore may also be designed as stochastic counters, already mentioned; this will be discussed further below.

Presently the generation of the correction frequency ($f_K$) will be discussed more closely. Provision is made to that end by the application of an interpolation counter 37 under the control of a control system 36. The counter 39 generates at its output a word which is of 5 bits in the embodiment shown, the word then being fed as a partial address to the read-only memory 38. Control system 36 reacts to the particular and instantaneous operational parameters of the internal combustion engine in such a manner that the data of state required for the instantaneous, particular operation of the engine reach interpolation counter 37 which, as already stated, forms a partial address therewith. This address will be completed by a number of bits, three in the embodiment illustrated, which are derived from the MSB parallel outputs of a series multiplier 39; these three outputs form the 3 LSB (least significant bits) for the address of read-only memory 38, said address consisting of 8 bits. The previously described divider circuit for the generation of the correction frequency somewhat operates as the DDA multiplier of FIG. 3, already discussed in relation to circuit 4', but with the difference that the binary word at series multiplier 39 for the valuation of the individual subharmonics is an 8-bit word from read-only memory 38. The potential applied to series multiplier 39 is a relatively low frequency ($f\theta$) which is proportional to the engine temperature. Such a frequency may be obtained for instance by means of an oscillator 40 which receives the temperature (value) of the internal combustion engine in the form of a resistance value and which is of such design that its output frequency may be controlled as a function of the resistance. Such oscillators are known in the art and need not be explained further. The parallel derivation of 3 MSB sites of the series multiplier 39 for the formation of the 3 LSBs for the address of memory 38 as shown in the embodiment allows obtaining a particularly simple interpolation circuit for addressing the memory and for achieving an output frequency (fA) of series multiplier 39 which always takes into account the significant operational states of the engine. It is to be understood that the dual forward-backward counter 41 loaded with the output frequency ($f_A$) of the series multiplier belongs as a component to this interpolation circuit, because the output frequency ($f_A$) decreases in the counter 41 as a binary count over a predetermined time interval. A sign from series multiplier 39 arrives via a second line 66 to the forward-backward counter 41 in parallel with the counting frequency ($f_A$) to the counter and determines the counter's direction of counting.

Interpolation counter 37 generating the 5 MSBs for memory 38 cyclically passes through the individual operational states of the engine and generates the engine address whenever being told by control 36 that there is actually such an operational state present. In such a case the operational state, for instance full load, is addressed by interpolation counter 37; the 5-bit address for this operational state then is completed by the 3 MSBs at the parallel output of series multiplier 39, that is, the divider counter of series multiplier 39 is being used simultaneously as an X-counter for the addressing of the memory.

On the other hand, it is possible also that several operational states be present simultaneously, for instance run-up boost following idle when starting the engine and when the engine is hot. Control 36 allows interpolation counter 37 to traverse these parallel operational states of this instance and to address them, the control only then feeding a transfer pulse through the line 43 to the memory 42 located after forward-backward counter 41 after all possible parallel operational states have been traversed cyclically once. In this manner one obtains a summation of the output frequencies which plausibly enough are different on account of the varying addressing of the read-only memory 38 for the sequentially traversing operational states in the forward-backward counter 41.

Whenever there is a new operational state communicated to the control 36 by the analog input signals A in their entirety, an initial counter content may be fed to the forward-backward counter 41 by a loading memory 44 with an upstream initial value. The memory, if desired, might be also correspondingly switched over by control 36 via line 45. In such a case the forward-backward counter begins its count with a given initial value; upon termination of the circulation predetermined by interpolation counter 37, the counter content arrives at intermediate storage 42 corresponding to the transfer pulse from control 36, the memory therefore then holding the sum of the correction factors. This intermediate memory 42 again with its parallel output forms the binary word which will be converted by an associated series multiplier 47 in a frequency in the manner already described. The feed frequency of the series multiplier 47 in this case is half that of the synchronization fundamental, that is fo/3, because a second correction dividing frequency relating to the so-called "λ regulation" of the internal combustion engine is generated separately in the present embodiment. Naturally it is possible to generate more than these two separate correction frequencies as individual partial frequencies, and on the other hand, the memory 38 may also store data values also allowing the inclusion of λ regulation in the sequence described further above.

The sum of the correction values belonging to a given operational state therefore is always in memory 42 for the duration of the cycle always determined by control 36 (which latter furthermore also may recognize the state of counter 37 by means of connecting line 48 to said counter), associated series-multiplier 47 also forming a partial correction frequency while using the binary word in memory 42.

The second partial correcting frequency of the embodiment is obtained from that potential provided by the λ probe already mentioned further above and located in the exhaust system of the engine. The potential of the λ—or oxygen probe $U_{80}$ is fed to a Schmitt trigger 49 which delivers an output potential depending on the λ potential that will be recognized as "sign" potential by a subsequent forward-backward counter 51. Depending on the sign of the output voltage of the Schmitt trigger 49, the counting direction of the forward-backward counter 51 will be the one or the other, and the count of the counter therefore will fluctuate in ordinary operation about a given value depending on the probe potential $U_{80}$. Again a series multiplier 52 is associated with the circuitry, which multiplier is being fed a counting frequency fo/2 and which forms a further partial correcting frequency ($f_K'$) from a DDA frequency obtained from the binary number in the forward-backward counter 51 in the manner already described. The partial correcting frequency ($f_K''$) from series multiplier 47 and the just previously mentioned partial correction frequency ($f_K''$) are joined together (summation point 53) and form the correction frequency ($f_K$) by means of which the backward counter 28 of main computer 1 is counted.

It was already indicated further above that the counters 27 and 28 may be so-called stochastic counters, that is, counters of which the outputs, if they are ideal stochastic circuits, are nearly statistically distributed and not predetermined. It is understood that for the stochastic counters used in this case, there obviously will be a defined output sequence of counter counts which will neither increase nor decrease monotonely but instead may assume any conceivable possible value, though the value may be predetermined because a defined circuit component is involved. Specially preferred among such stochastic counters may be a simple series of flip-flops, for instance so-called "D" flip-flops (delay flip-flops), the counting frequency being applied when appropriate to their trigger inputs and two or more outputs from the sequentially hooked-up flip-flops being connected by means of a coupling link to the input of the first flip-flop. When the counting frequency is applied, there will result not an arbitrary, but a defined output-sequence of counter-counts which however will not increase or decrease monotonely, and which may be defined as the direction of forward count, and which may be traversed by the stochastic forward counter 27. The stochastic backward counter 28 now may be so designed correspondingly as to traverse the output-sequence defined as the forward direction in the opposite sense, whereby one ensures that the common action of the two stochastic counters 27 and 28 will or may lead to a desired and precise output event, as can readily be seen.

Operation of the circuit shown in FIG. 2 in brief is such that the potential proportional to the air-quantity is converted into a frequency by the output of comparator 16 controlling the counting direction of forward-backward counter 18 by means of a word length of 8 bits in which is stored the air-quantity LM. The DDA multiplier 19 generates therefrom an air-quantity frequency $f_{LM}$, in which in turn following pulse shaping in the shaping stage 21 and analog formation of the average-value, results in the comparison potential for comparator 16. The latter therefore in conjunction with the subsequent forward-backward counter acting as an integrator which controls the generated air-quantity frequency that it will correspond to the analog input potential. While it is a fact that the word length prepared by 8 bits for the air-quantity LM drawn into the engine in the integrating forward-backward counter 18 is fairly short, one nevertheless obtains a far higher accuracy than corresponds to the word length from the forward-backward counter 18 because of the formation of the control loop. This air-quantity frequency ($f_{LM}$) then periodically counts the engine rpm, which can be relatively low. To that end a stochastic counter is required, as was explained shortly above. After transferring the counter contents of the forward-backward counter 27 into the result memory 29, the latter will hold the uncorrected injection duration, which results in a total injection pulse by counting down with the sum of the correction frequencies ($f_K$). The interpolation circuit for generating the partial correcting frequency ($f_K'$) also reduces the complexity and expenditure of circuitry because part of the address for storage 38 is generated in the associated DDA multiplier 39 itself. Several interpolations may be carried out sequentially in time, the result then being in the form of a sum in forward-backward counter 41. Arbitrary operational parameters may be incorporated into the initial value of the interpolation; the λ regulation uses a separate integrator of which the output frequency together with the interpolator output frequency will provide the correction frequency. The correction frequency ($f_k$) being used to count downward, a low such frequency denotes enrichment in injection.

The RC circuit formed by resistance 22 and capacitor 23 has a time constant Tv which is also a measure for the accuracy of the analog-digital conversion. This time-constant TV therefore should be selected to be $$Tv = 1/(2 \cdot \text{accuracy} \cdot f_{LMmin})$$

Again a time-constant is associated with the digit-frequency conversion by means of forward-backward counter 16 and DDA multiplier 19, the value of which may be determined by changing the counting frequency ($f_x$) and be so correspondingly adapted that Ti=2 Tv.

The time-constant in λ control for instance will be achieved if the counting frequency for forward-backward counter 51 is selected to be of the order of magnitude of engine rpm.

It is furthermore advantageous that the series multipliers used for the λ integrator and in converting the sum of the correction values in memory 42 can be economical because they are capable of making use also of the non-coincident partial frequencies of the multiplier of the input stage.

Mention already was made that so-called parallel multipliers may be used in lieu of series multipliers, the former not being specifically shown in the figures. Such a parallel multiplier operates in such manner that the numbers formed in it by the counters or integrators always will be again multiplied by themselves; the larger such a number, the more frequently there will be an overflow; the consequence from these overflows is the desired DDA frequency in the analog-digital conversion.

What is claimed is:

1. In an apparatus for determining the duration of the injection-control commands to be applied to the injection valves associated with an internal combustion engine, the duration of injection depending at least on engine rpm, temperature and airflow in the suction tube, including an air-quantity meter generating an air-quantity proportional potential, a temperature sensor in the vicinity of the internal combustion engine, a tachometer, and a computer circuit computing the duration of the injection pulses from the data provided, the improvement comprising:

a first counter fed by a counting frequency which is proportional to the amount of air taken in by the engine within a predetermined angle of rotation of the crankshaft.

an analog-to-frequency converter connected to the air-quantity meter and to the first counter for processing the output potential of said air-quantity meter, means for converting engine temperature into a proportional frequency, a multiplier circuit connected with the last-named means, an addressable read-only memory connected with the multiplier circuit, the stored data values in said memory being issued as a function of further operational parameters and being multiplicable by said temperature-proportional frequency in said multiplier circuit, means for generating at least one other frequency derived from at least one other operational parameter;

means for receiving and summing the output frequency of the multiplier circuit and said at least one other frequency in order to generate a total correction frequency, and a second counter which takes over the contents of said first counter for count-out at said total correction frequency; whereby the duration from the time of transfer to the time of a predetermined counter content may be used as a measure for the duration of the fuel injection time per piston stroke.

2. An apparatus as defined in claim 1, wherein the analog-to-frequency converter includes a binary up-down counter clocked by a counting frequency, a frequency multiplier connected to the up-down counter for converting the contents of said up-down counter, which are proportional to the air-quantity, into an air-quantity dependent frequency, and a comparator for generating the air-quantity dependent frequency, one input of said comparator receiving said air-quantity proportional potential and the other input receiving a feedback analog value related to said generated air-quantity frequency, and wherein the output signal of said comparator indicates the counting direction of the binary up-down counter.

3. An apparatus as defined in claim 2, wherein said frequency multiplier is a DDA series multiplier so connected that a relatively high input frequency applied to it may be divided into a number of non-coincident partial frequencies which may be selected depending on the associated position of the word formed in the up-down counter.

4. An apparatus as defined by claim 2, wherein said frequency multiplier is a parallel DDA multiplier in which the binary word formed in said up-down counter is added to itself at a predetermined frequency, and the number of overflows is exploited as said air-quantity frequency.

5. An apparatus as defined in claim 2, wherein the analog-to-frequency converter further includes a shaping circuit for receiving said air-quantity frequency generated at the output of said frequency multiplier and for performing a pulse-shaping compensation in step with fluctuations of the on-board power supply potential, wherein the output potential of said shaping circuit is fed to a subsequent integrating RC circuit which is connected to the other input of said comparator.

6. An apparatus as defined in claim 1, wherein said read-only memory receives a first partial address from an address counter depending on the operational state of the internal combustion engine, the parallel outputs of said read-only memory being connected to a DDA multiplier circuit for the conversion of the interrogated memory datum into a frequency, and wherein the counting frequency fed to the DDA multiplier embodied as a series multiplier is a frequency proportional to the engine temperature, and wherein a second partial address for said read-only memory is derived in parallel from the MSB outputs of said series multiplier for the purpose of interpolation, the output frequency from said series multiplier being fed to a subsequent binary up-down counter for the purpose of summing interpolations carried out in chronological sequence.

7. An apparatus as defined in claim 6, further comprising an initial value memory to which said counter which receives the output frequency from said series multiplier is connected for the purpose of transferring an initial value.

8. An apparatus as defined by claim 6, further comprising a control circuit for analyzing the particular operational states of the internal combustion engine, for controlling said address counter and for the cyclical formation of the partial addresses corresponding to the particular operational states, said control circuit causing a transfer of the counter contents of said up-down counter into a correction memory in cyclical sequence and when further operational states occur, said control circuit further causing the renewed setting of an initial value in said up-down counter, wherein the contents of said correction memory may be converted by means of an associated series multiplier into a first partial correction frequency.

9. An apparatus as defined in claim 8, further comprising means for generating an analog signal as a function of at least one other operational state, preferably the fuel-air ratio sensed by an oxygen probe in the engine exhaust, said analog signal being fed via a threshold circuit to a binary up-down counter for the determination of the counting direction thereof, and further comprising a series multiplier associated with said binary counter for the conversion of the continuously integrated potential into a further partial correction frequency, which together with said first partial correction frequency forms the total correction frequency at a summing point for counting out said second counter.

10. An apparatus as defined by claim 1, further comprising an intermediate memory for receiving the contents of said first counter counting the air-quantity frequency during a predetermined angle of the crankshaft rotation, the contents of said intermediate memory being fed to said second counter counting at the total correction frequency.

11. An apparatus as defined in claim 10, wherein said first counter and said second counter are designed as stochastic counters and comprise a number of sequentially connected flip-flop circuits the outputs of which are fed back over junction circuits such that one may obtain a defined output sequence of counter counts in a statistical distribution.

12. An apparatus as defined in claim 10, characterized in that upon transfer of the uncorrected value from said intermediate memory into said second counter an output flip-flop is set into one of its states, and that upon reaching a predetermined count in said second counter, said output flip-flop is returned by a null-sensing circuit into its initial state in such manner that the dwell time of said output flip-flop corresponds to the duration of fuel injection to said engine.

13. An apparatus as defined by claim 1 further comprising a control circuit and an associated address counter so connected that operational states simultaneously present will be converted in time sequence by interpolation into an output frequency of a series multiplier at said read-only memory and are stored as a sum in a subsequent binary up-down counter, wherein, when further operational states occur, correction values are obtained in cyclical sequence by erasing the content of said binary up-down counter and if appropriate by setting a new initial value from an initial-value memory.

* * * * *